US009019810B2

(12) United States Patent
Sun

(10) Patent No.: US 9,019,810 B2
(45) Date of Patent: Apr. 28, 2015

(54) METHOD OF ALLOCATING WALSH CODES AND QUASI-ORTHOGONAL FUNCTIONAL CODES IN A CDMA NETWORK

(75) Inventor: Qian Sun, Guangzhou (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 110 days.

(21) Appl. No.: 13/980,143

(22) PCT Filed: Jan. 17, 2011

(86) PCT No.: PCT/CN2011/000070
§ 371 (c)(1),
(2), (4) Date: Jul. 17, 2013

(87) PCT Pub. No.: WO2012/097467
PCT Pub. Date: Jul. 26, 2012

(65) Prior Publication Data
US 2013/0294218 A1    Nov. 7, 2013

(51) Int. Cl.
*H04J 11/00* (2006.01)
*H04W 72/04* (2009.01)
*H04J 13/00* (2011.01)
*H04J 13/18* (2011.01)

(52) U.S. Cl.
CPC ........... *H04W 72/04* (2013.01); *H04J 13/0048* (2013.01); *H04J 13/18* (2013.01)

(58) Field of Classification Search
None
See application file for complete search history.

(56) References Cited

U.S. PATENT DOCUMENTS

| 6,490,453 | B1 * | 12/2002 | Lee et al. | 455/450 |
| 6,831,909 | B1 * | 12/2004 | Koo et al. | 370/339 |
| 7,061,965 | B2 * | 6/2006 | Kodani et al. | 375/140 |
| 7,133,433 | B2 * | 11/2006 | Jalloul et al. | 375/141 |
| 7,400,614 | B2 * | 7/2008 | Buehrer et al. | 370/342 |
| 7,602,833 | B2 * | 10/2009 | Lee et al. | 375/130 |
| 7,792,532 | B1 * | 9/2010 | Narayanabhatla et al. | 455/447 |
| 8,126,469 | B2 * | 2/2012 | Sinnarajah et al. | 455/445 |
| 8,854,944 | B2 * | 10/2014 | Jou et al. | 370/208 |
| 2004/0146093 | A1 * | 7/2004 | Olson et al. | 375/148 |
| 2007/0015512 | A1 * | 1/2007 | Hunzinger | 455/439 |
| 2007/0123247 | A1 * | 5/2007 | Hunzinger | 455/422.1 |

FOREIGN PATENT DOCUMENTS

| CN | 1290439 A | 4/2001 |
| CN | 1286851 A | 7/2001 |
| CN | 1304592 A | 7/2001 |
| CN | 1545787 A | 11/2004 |
| CN | 101297511 A | 10/2008 |

* cited by examiner

*Primary Examiner* — Phirin Sam

(57) ABSTRACT

A method of allocating Walsh codes and Quasi-orthogonal Functional, QoF, codes in a CDMA system in which a finite number of Walsh codes are defined, and some mobile terminals operating in the CDMA system are capable of supporting Advanced Quasi-Linear Interference Cancellation, AQLIC, and some mobile terminals operating in the CDMA system are non-AQLIC-capable. Walsh codes are allocated to control channels. A code allocation unit then determines a threshold number of Walsh codes to reserve for non-AQLIC-capable mobile terminals. When a current Walsh code usage level is less than the threshold, the unit allocates Walsh codes to both the AQLIC-capable mobile terminals and the non-AQLIC-capable mobile terminals. When the current Walsh code usage level is greater than the threshold, the unit allocates QoF codes only to AQLIC-capable mobile terminals, and allocates Walsh codes to non-AQLIC-capable mobile terminals.

7 Claims, 3 Drawing Sheets ent invention relates generally to communication
METHOD OF ALLOCATING WALSH CODES AND QUASI-ORTHOGONAL FUNCTIONAL CODES IN A CDMA NETWORK

TECHNICAL FIELD

The present invention relates generally to communication systems, and more particularly, to a system and method for allocating Walsh codes and Quasi-orthogonal Functional (QoF) codes in a Code Division Multiple Access (CDMA) radio access network.

BACKGROUND

In CDMA radio access networks, Walsh codes and QoF codes are assigned to each user for baseband signal spreading. The IS2000 specification defines one Walsh code set and four QoF code sets. Each set has 128 Walsh/QoF codes, each with a length of 128 bits. Each user is assigned a different Walsh code or QoF code.

In CDMA Single-Carrier Radio Transmission Technology (1×RTT), a Walsh code allocation algorithm as defined in U.S. Pat. No. 7,539,162 has been implemented in Base Transceiver Station/Base Station Controller (BTS/BSC) products. This allocation algorithm enables a BTS to support approximately 35 Enhanced Variable Rate Codec (EVRC) users and 46 advanced EVRC (EVRC-B) users in one carrier-sector. In this case, BTS user capacity is limited by forward power, and 128 Walsh codes are sufficient to support maximum BTS user capacity. QoF codes are not used, and therefore no QoF allocation algorithm has been implemented in BTS products.

Another reason that QoF codes have not been used is that their use introduces significant non-orthogonal interference. High non-orthogonal interference causes a mobile terminal that uses a QoF code to experience much higher interference than mobile terminals using Walsh codes. This results in a negative service quality impact.

With the recent introduction of 1×Advanced carrier, user capacity for one carrier increased to approximately three times the capacity for a 1×RTT carrier. As a result, the Walsh code set is no longer sufficient, and allocating mobile terminals with a QoF code is necessary. As a part of 1×Advanced technology, new mobile terminals may support Advanced Quasi-Linear Interference Cancellation (AQLIC), which maximally cancels non-orthogonal interference.

SUMMARY

The present invention provides a code allocation unit and a method of allocating Walsh codes and QoF codes to support an approximate three-fold increase in user capacity in CDMA systems such as 1×Advance carrier CDMA systems.

In one embodiment, the present invention is directed to a method of allocating Walsh codes and QoF codes in a CDMA system in which a finite number of Walsh codes are defined, and some mobile terminals operating in the CDMA system are capable of supporting AQLIC and some mobile terminals operating in the CDMA system are non-AQLIC-capable. The method includes the steps of determining a user loading per carrier-sector; determining whether the finite number of Walsh codes is sufficient to support the user loading; and when the finite number of Walsh codes is sufficient to support the user loading, allocating Walsh codes to both the AQLIC-capable mobile terminals and the non-AQLIC-capable mobile terminals. When the finite number of Walsh codes is not sufficient to support the user loading, the method includes allocating QoF codes only to AQLIC-capable mobile terminals; and allocating Walsh codes to non-AQLIC-capable mobile terminals.

In another embodiment, the present invention is directed to a method of allocating Walsh codes and QoF codes in a CDMA system in which a finite number of Walsh codes are defined, and some mobile terminals operating in the CDMA system are capable of supporting AQLIC and some mobile terminals operating in the CDMA system are non-AQLIC-capable. The method includes the steps of determining a threshold number of Walsh codes to reserve for non-AQLIC-capable mobile terminals; determining whether a current Walsh code usage level is greater than the threshold; and when the current Walsh code usage level is not greater than the threshold, allocating Walsh codes to both the AQLIC-capable mobile terminals and the non-AQLIC-capable mobile terminals. When the current Walsh code usage level is greater than the threshold, the method includes allocating QoF codes only to AQLIC-capable mobile terminals; and allocating Walsh codes to non-AQLIC-capable mobile terminals.

In another embodiment, the present invention is directed to a code allocation unit for allocating Walsh codes and QoF codes to mobile terminals in a CDMA system in which a finite number of Walsh codes are defined, and some mobile terminals operating in the CDMA system are capable of supporting AQLIC and some mobile terminals operating in the CDMA system are non-AQLIC-capable. The code allocation unit includes a program memory for storing computer program instructions; and a code allocation processor for executing the computer program instructions, wherein execution of the computer program instructions causes the processor to utilize a current Walsh code usage level and a penetration level for non-AQLIC-capable mobile terminals as inputs to determine a threshold number of Walsh codes to reserve for the non-AQLIC-capable mobile terminals; determine whether the current Walsh code usage level is greater than the threshold; allocate Walsh codes to both the AQLIC-capable mobile terminals and the non-AQLIC-capable mobile terminals when the current Walsh code usage level is not greater than the threshold; and allocate QoF codes only to AQLIC-capable mobile terminals while allocating Walsh codes to non-AQLIC-capable mobile terminals when the current Walsh code usage level is greater than the threshold.

The present invention thus provides a simple and effective method of allocating QoF Walsh codes in a CDMA radio access network in most cases.

DETAILED DESCRIPTION

Figure 1:
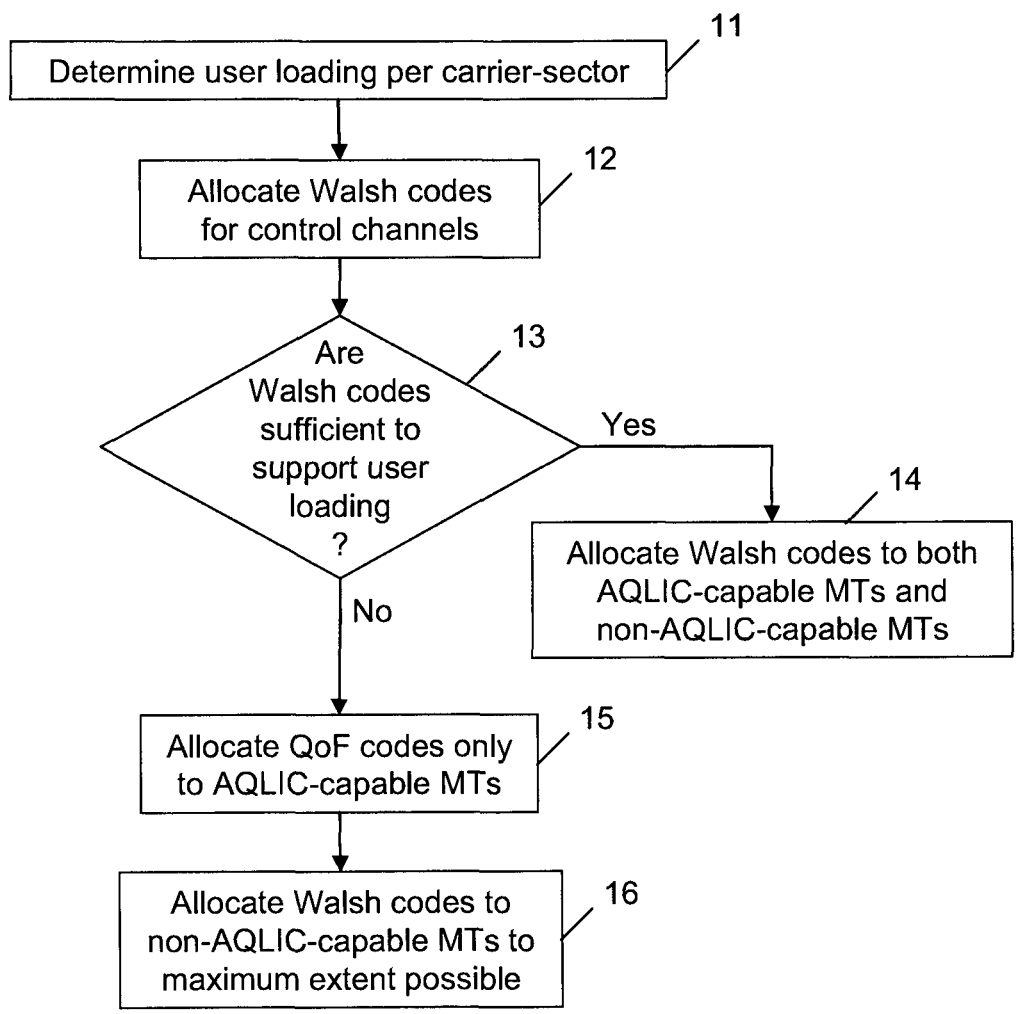
FIG. 1 is a flow chart illustrating the steps of an exemplary embodiment of the method of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data information) to the second entity regardless of the type (analog or digital) of those signals. It is further noted that various figures (including component diagrams) shown and discussed herein are for illustrative purpose only, and are not drawn to scale.

Within the communications industry, several options have been proposed for allocating Walsh/QoF codes to mobile terminals, although none are currently implemented. These include:

1) Alternatively allocate Walsh codes and QoF codes (i.e., allocate one Walsh code then one QoF code and so on). Although this approach is fair and the interference experienced by mobile terminals is almost the same, the total interference is the highest of all options.

2) Allocate all Walsh codes then QoF codes when Walsh codes are depleted. Although this approach provides minimal total interference and less impact to control channels, the first mobile terminals to start using a QoF code will experience very high interference (i.e., non-orthogonal interference from 100+Walsh code users).

3) Allocate $2^m$ (typically m=5) Walsh codes then $2^m$ QoF codes and so on. This approach provides performance somewhere between Option 1 and Option 2 and thus is somewhat efficient and somewhat fair. However, the approach is not optimal or flexible enough.

4) Allocate a QoF code to mobile terminals with low geometry factor. That is to say, when a mobile terminal is close to the cell center and requires low forward power, it is allocated a QoF code. Theoretically, this approach provides an excellent result, but is difficult to implement in a real-world product since the mobile terminal's geometry is unknown when a call is being set up.

Since there are drawbacks with all of the proposed options above, the present invention utilizes a different general strategy for allocating Walsh codes and QoF codes, as described below. In general, Walsh codes are allocated for control channels, and then if there are sufficient Walsh codes to support the user loading, Walsh codes are allocated to all mobile terminals. If Walsh codes are not sufficient to support the user loading, QoF codes are allocated only to AQLIC-capable mobile terminals, while Walsh codes are allocated to non-AQLIC-capable mobile terminals to the maximum extent possible.

FIG. 1 is a flow chart illustrating the steps of an exemplary embodiment of the method of the present invention. At step 11, the user loading per carrier-sector is determined. At step 12, Walsh codes are allocated for control channels. At step 13, it is determined whether Walsh codes are sufficient to support the user loading. If so, the method moves to step 14 where Walsh codes are allocated to both AQLIC-capable mobile terminals and non-AQLIC-capable mobile terminals, because this approach causes less interference to control channels. However, if Walsh codes are not sufficient to support the user loading, the method moves to step 15 where QoF codes are allocated only to AQLIC-capable mobile terminals, which can maximally cancel non-orthogonal interference. At step 16, Walsh codes are allocated to non-AQLIC-capable mobile terminals to the maximum extent possible.

In one embodiment, this allocation is achieved by reserving a certain number of Walsh codes for non-AQLIC-capable mobile terminals. Simulation results show that user capacity increases by approximately five percent when the Walsh code reserving algorithm of the present invention is introduced.

The number of Walsh codes that should be reserved for non-AQLIC-capable mobile terminals is a factor in determining the performance of this algorithm. Reserving too many or too few Walsh codes than necessary will lead to higher total interference. Additionally, if too few are reserved, some non-AQLIC-capable mobile terminals will inevitably be allocated QoF codes, causing them to experience service quality degradation.

Figure 2:
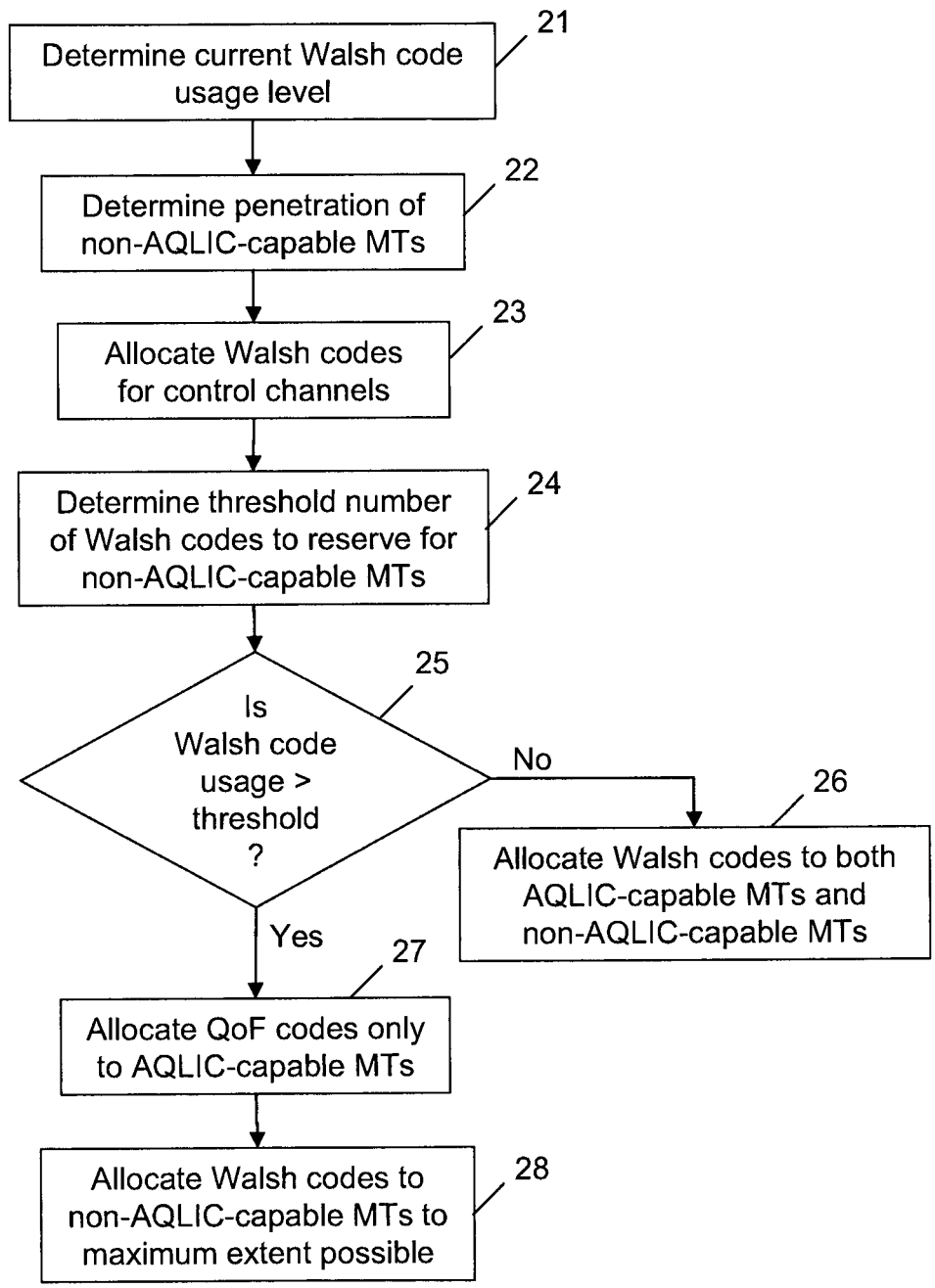
FIG. 2 is a flow chart illustrating the steps of another exemplary embodiment of the method of the present invention.

FIG. 2 is a flow chart illustrating the steps of another exemplary embodiment of the method of the present invention. In this embodiment, the threshold number of Walsh codes (WCs) that should be reserved for non-AQLIC-capable mobile terminals is determined based on Walsh code usage and penetration of non-AQLIC-capable mobile terminals. At step 21, the current Walsh code usage level is determined. At step 22, the degree of penetration of non-AQLIC-capable mobile terminals is determined. At step 23, Walsh codes are allocated for control channels. At step 24, a threshold number of Walsh codes to reserve for non-AQLIC-capable mobile terminals is determined based on the Walsh code usage level and the penetration of non-AQLIC-capable mobile terminals. At step 25, it is determined whether the. Walsh code usage is greater than the threshold. If not, the method moves to step 26, where Walsh codes are allocated to both AQLIC-capable mobile terminals and non-AQLIC-capable mobile terminals, because this approach causes less interference to control channels. In this situation, the Walsh code allocation strategy may still follow the algorithm described in U.S. Pat. No. 7,539,162. However, if the Walsh code usage is greater than the threshold, the method moves to step 27 where QoF codes are allocated only to AQLIC-capable mobile terminals, which can maximally cancel non-orthogonal interference. At step 28, Walsh codes are allocated to non-AQLIC-capable mobile terminals to the maximum extent possible.

Step 24 above may be further defined as follows:

a. For each in-coming call, calculate the penetration of non-AQLIC-capable mobile terminals (i.e., "old mobiles"). On incoming call N, the old mobile penetration may be calculated by:

OldMobilePenetration (N)=(Walsh code # used by old mobiles+QoF code # used by old mobiles)/(total used Walsh codes #+total used QoF code #).

The average old mobile penetration for incoming call N may be calculated by:

When $N$=0, OldMobilePenetration_avg ($N$)=OldMobilePenetration ($N$).

When $N$>0, OldMobilePenetration_avg ($N$)=OldMobilePenetration ($N$)*(1−alpha)+OldMobilePenetration_avg ($N$−1)*alpha where alpha is an averaging factor. The default value for alpha may be set to 0.33.

b. For each in-coming call, calculate Walsh code usage by the following formula:

WCUsage=(Walsh code # used by old mobiles+Walsh code # used by new mobiles)/total Walsh code # available for traffic channel (e.g., 115).

c. Denote total Walsh codes available for the traffic channel as TotalWCForTraffic and set it, for example, to 115. On average, among all used Walsh codes, old mobiles have taken TotalWCForTraffic*WCUsage* OldMobilePenetration_avg. In all available Walsh codes, old mobiles will take TotalWCForTraffic*(1−WCUsage)*OldMobilePenetration_avg. Then this is the average number of Walsh codes that should be reserved.

d. However, the above is only the average Walsh code number that should be reserved. In order to maximally avoid allocating QoF codes to old mobiles, a variance may be added. The variance may be set to:

TotalWCForTraffic*V %*WC Usage*OldMobilePenetration_avg, where V % is a variance percentage. In an exemplary embodiment, V % may be set to 50%, which causes the above formula to represent half of the Walsh codes that have already been used by the old mobiles. This variance may be chosen because in a Poisson distribution, variance is equal to the traffic arrival rate (here, the old mobile traffic arrival rate is TotalWCForTraffic *WCUsage*OldMobilePenetration_avg). However, only half of the variance needs to be covered (i.e., from average to upper bound), therefore, the total Walsh codes used by old mobiles is multiplied by 50%. It should be noted that 50% is an exemplary value. If an operator desires to be more conservative, a larger value may be utilized so that non-AQLIC-capable mobile terminals are less likely to be allocated a QoF code.

In summary, for each call, the Walsh code number that should be reserved is:

TotalWCForTraffic*(1−WCUsage)*OldMobilePenetration_avg+
TotalWCForTraffic*50%*WCUsage*OldMobilePenetration_avg.

Figure 3:
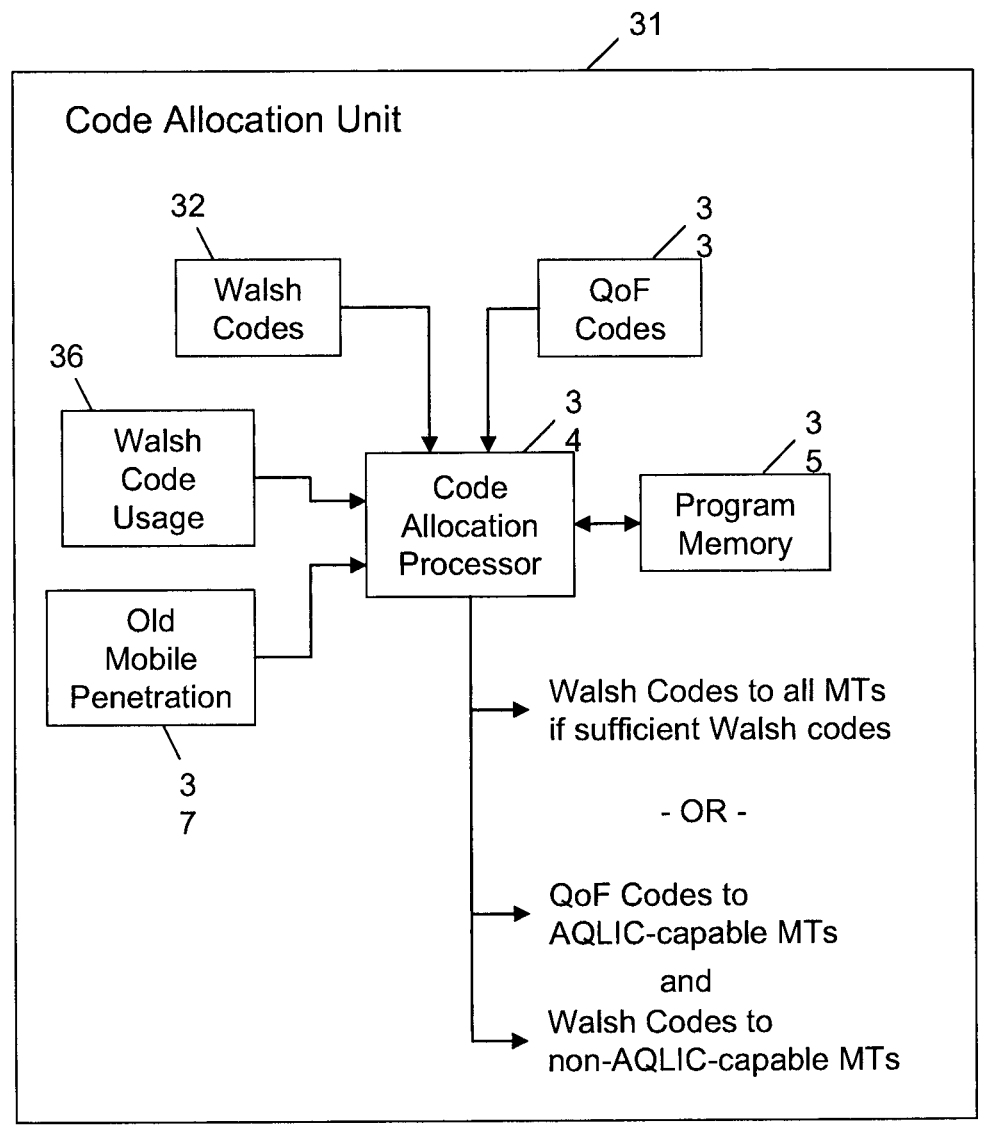
FIG. 3 is a simplified block diagram of a code allocation unit in an exemplary embodiment of the present invention.

FIG. 3 is a simplified block diagram of a code allocation unit 31 in an exemplary embodiment of the present invention. The allocation unit selectively allocates a plurality of Walsh codes 32 and QoF codes 33 to mobile terminals. In one embodiment, the operation of the allocation unit may be controlled by a code allocation processor 34 such as a microprocessor, executing computer program instructions stored on a program memory 35. In other embodiments, the allocation unit may be controlled by a hardware circuit, by firmware, or by a combination. As inputs, the code allocation processor receives Walsh code usage and old mobile penetration as calculated above.

In one embodiment, if the number of available Walsh codes is sufficient to support all users, the processor allocates Walsh codes to both AQLIC-capable mobile terminals and to non-AQLIC-capable mobile terminals. If there is not a sufficient number of Walsh codes to support all users, the processor allocates QoF codes only to AQLIC-capable mobile terminals, and allocates Walsh codes to non-AQLIC-capable mobile terminals to the maximum extent possible.

In another embodiment, the code allocation processor 34 determines the threshold number of Walsh codes to reserve for non-AQLIC-capable mobile terminals based on the current Walsh code usage level 36 and the degree of penetration of non-AQLIC-capable (i.e., old) mobile terminals 37. When the Walsh code usage is less than the threshold level, the processor allocates Walsh codes to both AQLIC-capable mobile terminals and non-AQLIC-capable mobile terminals. When the Walsh code usage is greater than the threshold level, the processor allocates QoF codes only to AQLIC-capable mobile terminals, and allocates Walsh codes to non-AQLIC-capable mobile terminals to the maximum extent possible. In both embodiments of the code allocation unit 31, Walsh codes are allocated for control channels.

In one embodiment, the code allocation processor 34 also computes the current Walsh code usage level 36 and the degree of penetration of non-AQLIC-capable (i.e., old) mobile terminals 37.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of allocating Walsh codes and Quasi-orthogonal Functional, QoF, codes to mobile terminals in a Code Division Multiple Access, CDMA, system in which a finite number of Walsh codes are defined, and some mobile terminals operating in the CDMA system are capable of supporting Advance Quasi-Linear Interference Cancellation, AQLIC, and some mobile terminals operating in the CDMA system are non-AQLIC-capable, the method comprising the steps of:
   determining a user loading per carrier-sector;
   determining whether the finite number of Walsh codes is sufficient to support the user loading;
   when the finite number of Walsh codes is sufficient to support the user loading, allocating Walsh codes to both the AQLIC-capable mobile terminals and the non-AQLIC-capable mobile terminals; and
   when the finite number of Walsh codes is not sufficient to support he user loading:
      allocating QoF codes only to AQLIC-capable mobile terminals; and
      allocating Walsh codes to non-AQLIC-capable mobile terminals.

2. The method according to claim 1, further comprising allocating Walsh codes for control channels.

3. A method of allocating Walsh codes and Quasi-orthogonal Functional, QoF, codes to mobile terminals in a Code Division Multiple Access, CDMA, system in which a finite number of Walsh codes are defined, and some mobile terminals operating in the CDMA system are capable of supporting Advance Quasi-Linear Interference Cancellation, AQLIC, and some mobile terminals operating in the CDMA system are non-AQL1C-capable, the method comprising the steps of:
   determining a threshold number of Walsh codes to reserve for non-AQLIC-capable mobile terminals;
   determining whether a current Walsh code usage level is greater than the threshold;
   when the current Walsh code usage level is not greater than the threshold, allocating Walsh codes to both the AQLIC-capable mobile terminals and the non-AQLIC-capable mobile terminals; and
   when the current Walsh code usage level is greater than the threshold:
      allocating QoF codes only to AQLIC-capable mobile terminals; and
      allocating Walsh codes to non-AQLIC-capable mobile terminals.

4. The method according to claim 3, wherein the step of determining a threshold number of Walsh codes to reserve for non-AQLIC-capable mobile terminals, includes the steps of:
   determining the current Walsh code usage level;
   determining a penetration level of non-AQLIC-capable mobile terminals; and
   determining the threshold number of Walsh codes based on the current Walsh code usage level and the penetration level of non-AQLIC-capable mobile terminals.

5. The method according to claim 4, further comprising, before determining the current Walsh code usage level, the step of allocating Walsh codes for control channels.

6. A code allocation unit for allocating Walsh codes and Quasi-orthogonal Functional, QoF, codes to mobile terminals in a Code Division Multiple Access, CDMA, system in which a finite number of Walsh codes are defined, and some mobile terminals operating in the CDMA system are capable of supporting Advance Quasi-Linear Interference Cancellation, AQLIC, and some mobile terminals operating in the CDMA system are non-AMC-capable, the code allocation unit comprising:
  a program memory for storing computer program instructions; and
  a code allocation processor for executing the computer program instructions, wherein execution of the computer program instructions causes the processor to:
    utilize a current Walsh code usage level and a penetration level for non-AQLIC-capable mobile terminals as inputs to determine a threshold number of Walsh codes to reserve for the non-AQLIC-capable mobile terminals;
    determine whether the current Walsh code usage level is greater than the threshold;
    allocate Walsh codes to both the AQLIC-capable mobile terminals and the non-AQLIC-capable mobile terminals when the current Walsh code usage level is not greater than the threshold; and
    allocate QoF codes only to AQLIC-capable mobile terminals while allocating Walsh codes to non-AQLIC-capable mobile terminals when the current Walsh code usage level is greater than the threshold.

7. The code allocation unit according to claim 6, wherein execution of the computer program instructions causes the processor to:
  compute the current Walsh code usage level; and
  compute the penetration level for non-AQLIC-capable mobile terminals.

\* \* \* \* \*